United States Patent [19]
Wang et al.

[11] Patent Number: 5,867,230
[45] Date of Patent: Feb. 2, 1999

[54] SYSTEM, DEVICE, AND METHOD FOR STREAMING A MULTIMEDIA FILE ENCODED AT A VARIABLE BITRATE

[75] Inventors: Feng Chi Wang, Newton; Thomas Goetz, Attleboro; Krystyna Wieckiewicz, Plainville, all of Mass.

[73] Assignee: Motorola Inc., Schaumburg, Ill.

[21] Appl. No.: 885,271

[22] Filed: Jun. 30, 1997

Related U.S. Application Data

[63] Continuation-in-part of Ser. No. 711,701, Sep. 6, 1996.
[51] Int. Cl.[6] .............................. H04N 7/26; H04N 7/52; H04N 7/56; H04N 7/62
[52] U.S. Cl. ........................................... 348/845; 348/423
[58] Field of Search ............................... 348/845, 845.2, 348/845.3, 423, 12, 13; H04N 7/26, 7/52, 7/56, 7/62

[56] References Cited

U.S. PATENT DOCUMENTS

| | | | |
|---|---|---|---|
| 5,481,312 | 1/1996 | Cash | 348/845.2 |
| 5,612,742 | 3/1997 | Krause | 348/385 |
| 5,659,539 | 8/1997 | Porter | 348/13 |
| 5,768,539 | 6/1998 | Metz | 348/385 |
| 5,790,543 | 8/1998 | Cloutier | 348/423 |

*Primary Examiner*—Howard Britton
*Attorney, Agent, or Firm*—Peter Dichiara

[57] ABSTRACT

System, Device, And Method For Streaming A Multimedia File Encoded at a Variable Bitrate. The data is encoded at a variable bit rate and formed into packets having a server time stamp. The server time stamps are constructed so that the streaming of the packets will be substantially constant, not variable, and equal to a desired, budgeted bandwidth, such as one corresponding to fully utilizing a modem link. To schedule the sending of packets, the server uses the server time stamp, rather than, for example, the play-back time stamp. By having the data encoded at a variable bit rate, the otherwise-unused capacity, i.e., the capacity not used by the server, can be used to send packets needed in the future. This is accomplished by the server time stamps scheduling packets for transmission that will not be needed until the future.

2 Claims, 8 Drawing Sheets

SYSTEM, DEVICE, AND METHOD FOR STREAMING A MULTIMEDIA FILE ENCODED AT A VARIABLE BITRATE

This application is a continuation-in-part of the following co-pending application, which is assigned to the assignee of this application and which is incorporated by reference herein System, Device, And Method For Streaming A Multimedia File (Ser. No. 08/711,701, to Tom Goetz, Manickam R. Sridhar, and Mukesh Prasad, filed on Sep. 9, 1996).

CROSS-REFERENCE TO RELATED APPLICATIONS

This application is related to the following U.S. patent applications, all of which are assigned to the assignee of this application and all of which are incorporated by reference herein:

Improved Video Encoding System And Method (Ser. No. 08/711,702, to Manickam R. Sridhar and Feng Chi Wang, filed on Sep. 9, 1996);

Apparatus, System, and Method for Improved Error Recovery in a Video Encoding System (Ser. No. 08/741,455, to Feng Chi Wang, filed on Oct. 31, 1996); and System and Device for, and Method of, Encoding Video Information for Improved Streaming Thereof, filed on even date herewith, having inventor Feng Chi Wang Ser. No. 08/885,076.

BACKGROUND

1. Field of the Invention

The invention generally relates to multimedia applications and, more particularly, to the encoding and streaming of video information over a communication network.

2. Discussion of Related Art

Generally speaking, there are two modern approaches to "playing-back" multimedia information located at a remote location, such as playing-back a "video clip" on the Internet. The first approach is to have a client node download a file having the video information from a corresponding "website," or server node, and to then play-back the information, once the file has been completely transferred. The second approach is to have the sever node "stream" the information to the client node so that the client may begin play-back soon after the information starts to arrive. Because the streaming approach does not suffer from the long start-up delays inherent in the downloading approach, it is believed to be preferable in certain regards.

It is believed that a substantial number of remote access users, such as Internet users, access the network via a voiceband modem. To this end, various communication standards have been proposed. H.261 and H.263, for example, each specify a coded representation that can be used for compressing video at low bitrates. (See ITU-T Recommendation H.263 of 2 May 1996, which is hereby incorporated by reference in its entirety.)

Because typical voiceband modems have maximum data rates of less than 56 Kb/s, the quality of a streamed play-back depends on how effectively the channel is used. TrueStream™ Streaming Software, version 1.1, for example, keeps the channel at full utilization to improve the play-back's appearance. (TrueStream™ Streaming Software, version 1.1, is available from Motorola, Inc.)

In short, with version 1.1 of the TrueStream™ Streaming Software, a target data rate is first selected, for example, 20 Kb/sec for a 28.8 Kb/sec modem, the other 8.8 Kb/sec of bandwidth being saved for audio information and packet overhead. If a sequence of video frames is to be encoded and because of its inherent informational content the streaming of the encoded data would require a data rate higher than the target rate, then the TrueStream™ system adjusts certain encoding parameters so that encoded frames require less bits. On the other hand, if a sequence of video frames is to be encoded such that the streaming of it would not fully utilize the channel, the TrueStream™ system applies a "use it or lose it" approach and adjusts certain encoding parameters to improve the video quality and so that the channel capacity is used. The consequence of the above is that in the former case the sequence will be played-back with pictures having a relatively coarser level of detail and a relatively smaller frame rate, and that in the latter case, the sequence will be played-back with pictures having a finer level of detail and a higher frame rate.

DETAILED DESCRIPTION

The invention involves a system and device for, and a method of, encoding information for improved streaming thereof.

Exemplary embodiments of the invention encode video information at variable bitrates and by doing so can utilize the channel in new and useful ways. For example, if the informational content of certain video frames can be encoded at a relatively low bitrate, the otherwise-unused channel capacity can be used to transmit information that will be needed for future video frames. This might be helpful in that a future portion of a video stream might require so much data that it might otherwise have been streamable only by sacrificing the quality of its play-back.

The exemplary embodiments are particularly concerned with video information encoded according to H.263. Thus, material aspects of H.263 are outlined below, followed by a description of the exemplary embodiments.

I. Outline of H.263

A video sequence is encoded and decoded as a sequence of frames or pictures. Each picture is organized as groups of blocks (GOBs), macroblocks, and blocks, and each picture may be of a variety of picture formats and subformats. In addition, each picture may be of INTER type, also known as an "I" frame, or INTRA type, which includes entities known as "P" frames and "PB" frames.

An "I" frame is independent in that it represents a complete image, or portion of an image. Its encoding and decoding has no dependencies on prior frames. With "P" and "PB" frames, on the other hand, the encoding and decoding depends on prior frames. P and PB frames may be thought of as an encoded representation of the difference between one picture and a prior picture.

Figure 1:
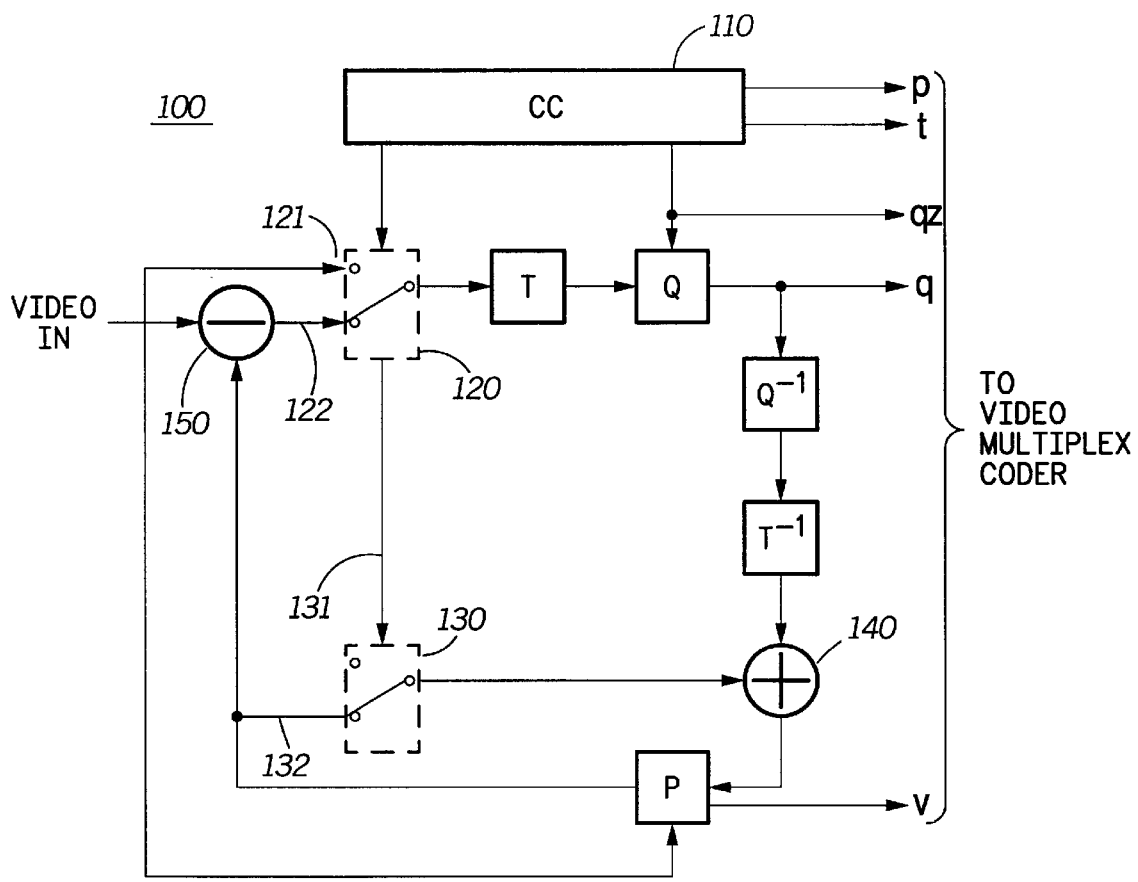
FIG. 1 shows a standard source encoder 100 having a known architecture.

FIG. 1 shows a standard source encoder 100. Coding controller 110, among other things, controls switches 120 and 130 and quantizer Q. In short, the controller 110 controls the sampling rate, or frame rate, of the video sequence by selecting particular frames of Video In, and it controls the level of detail of each encoded picture by supplying quantization parameters qz to quantizer Q. The output information 'q' is a compressed version of a picture: an I frame is a compressed version of a current picture, or portion thereof, and a P or PB frame is a compressed version of difference information, representing the difference between the current picture, or portion thereof, and the last.

For I frame blocks, coding controller 110 connects switch 120 to input 121 and switch 130 to input 131. Thus, Video In is connected to the transform block T, which processes the data according to a known discrete cosine transform (DCT). The transformed data, known as transform coefficients, are then quantized by quantizer Q, and the quantized information 'q' is received by inverse quantizer $Q^{-1}$. The inverse quantized information, in turn, is received by inverse transform $T^{-1}$, and the inverse transformed information is received by summation node 140. Consequently, summation node 140 adds unconnected input 131 and the reconstituted picture information from the inverse transform $T^{-1}$, the reconstituted picture information being the picture Video In after it has been transformed, quantized, inverse quantized, and inverse transformed. The output of the summation node 140 is thus the reconstituted picture information, which is stored in picture memory P.

For P or PB type blocks, coding controller 110 controls switches 120 and 130 to connect to inputs 122 and 132, respectively. Difference node 150 produces the difference between the current block, Video In, and the prior, reconstituted block, provided by picture memory P. This difference information is then transformed (T), quantized (Q), inverse quantized ($Q^{-1}$), and inverse transformed ($T^{-1}$) analogously to that described above. The information provided by inverse transform ($T^{-1}$), in this arrangement, however, is not the reconstituted picture, but rather the reconstituted difference information originally provided by difference node 150. Summation node 140 adds the reconstituted difference information to the prior block, provided by input 132, to yield a reconstituted version of the current picture, which is stored in picture memory P.

The compression gains achieved by the above arrangement result from the statistical nature of video information and from the quantization rules. In particular, a given pixel in one frame is likely to be the same or nearly the same as a corresponding pixel of a prior frame. Moreover, pixels having no difference from one picture to the next tend to run contiguously so that many adjacent pixels might be identical to the corresponding pixels of a prior frame. The H.263 quantization rules address the above with a variety of techniques that can be summarized by stating that the more probable video information events require less encoded bits than the less probable events. (See ITU-T Recommendation H.263 of 2 May 1996, at 25–27, variable and fixed length codes for transform coefficients.)

The amount of bits needed to represent a picture or block depends on three things: (a) whether the blocks are being encoded as INTER or INTRA type; (b) the informational nature of a block in relation to a prior block; and (c) the level of quantization used in the encoding. Typically, INTRA-based encoding requires less bits than INTER-based encoding for a given frame, and coarser detail requires less encoded bits than finer detail, everything else being equal. Thus, the selection of INTER or INTRA and the level of quantization are the only independent variables affecting the amount of data required to encode a given picture, Video In.

Figure 2:
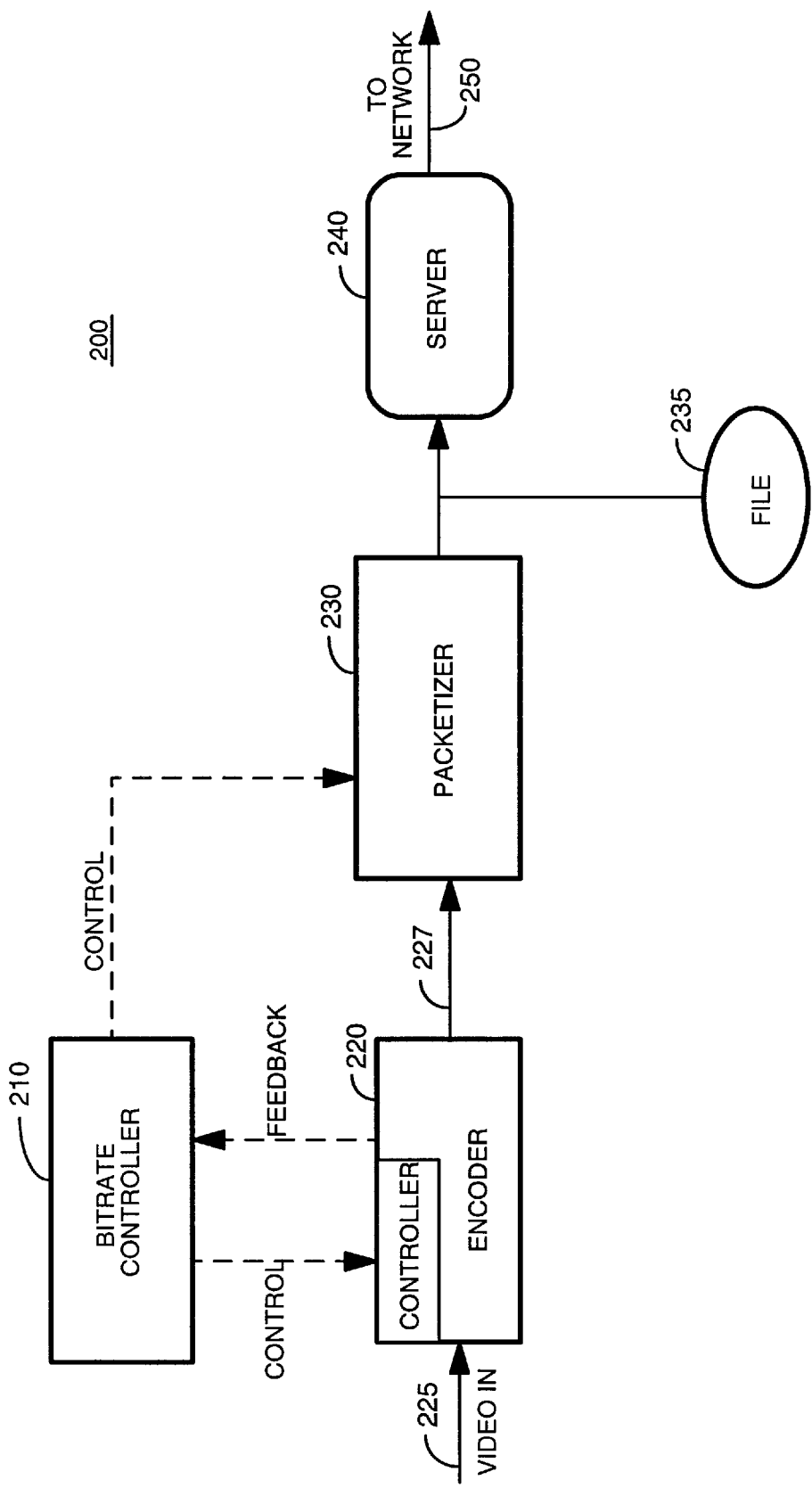
FIG. 2 shows a system architecture of an exemplary embodiment of the invention.

II. Overview of a System and Device for, and Method of, Encoding Video Information for Improved Streaming Thereof FIG. 2 shows an exemplary system 200 for encoding and packetizing files of variable bitrate video data. Video In is received by encoder 220, which encodes the information, under the control of coding control 225 and bitrate controller 210. The encoded data 227 is received by packetizer 230, which is partially controlled by bitrate controller 210, and which packetizes the information into a specified format to create a file 235. File 235 may then be used by server logic 240 to stream the information over the network 250.

a. Encoder and Controller

Encoder 220 includes the elements of FIG. 1, except that the coding controller 110 of FIG. 1 is divided into controller 225 and bitrate controller 210, discussed below. Controller 225 includes control features known in the art as well as control features described in the related applications identified and incorporated above. (The application entitled Improved Video Encoding System And Method includes features that would control the bitrate of the data stream in a mutually-exclusive manner to that covered by the bitrate controller 210. Under one embodiment of the invention, a user input allows selection between the two.)

b. Bitrate Controller

The bitrate controller 210 partially controls the encoding of Video In so that it is encoded at an efficient, variable bitrate while also attempting to satisfy specified quality criteria. The actual amount of data needed to encode a picture, and thus the bitrate, will depend on the informational content of the video frames. In an exemplary embodiment, the quality criteria are to keep the quantization level, or the level of detail, the same for all macroblocks within a picture and for all pictures in a sequence.

The instant approach implements a "use it or lose it" philosophy, but "uses" the otherwise-unused bandwidth in a novel way. In particular, when frames are encoded at a relatively low bitrate (i.e., less than the target rate or Encoder rate, e.g., 20 Kb/sec), the unused bandwidth is effectively conserved so that it may be used to transmit information corresponding to a future portion of the video. Consequently, future portions of video having a high informational content, and thus requiring a large amount of data for the encoding thereof, are more likely to be streamable without sacrificing quality of the picture and in any even if quality needs to be sacrificed for the encoding less sacrifice will be needed. (Quality in this sense refers to the quantization level, or the level of detail of the picture(s), and the frame rate, or the number of pictures eventually displayed per second)

Figure 3A:
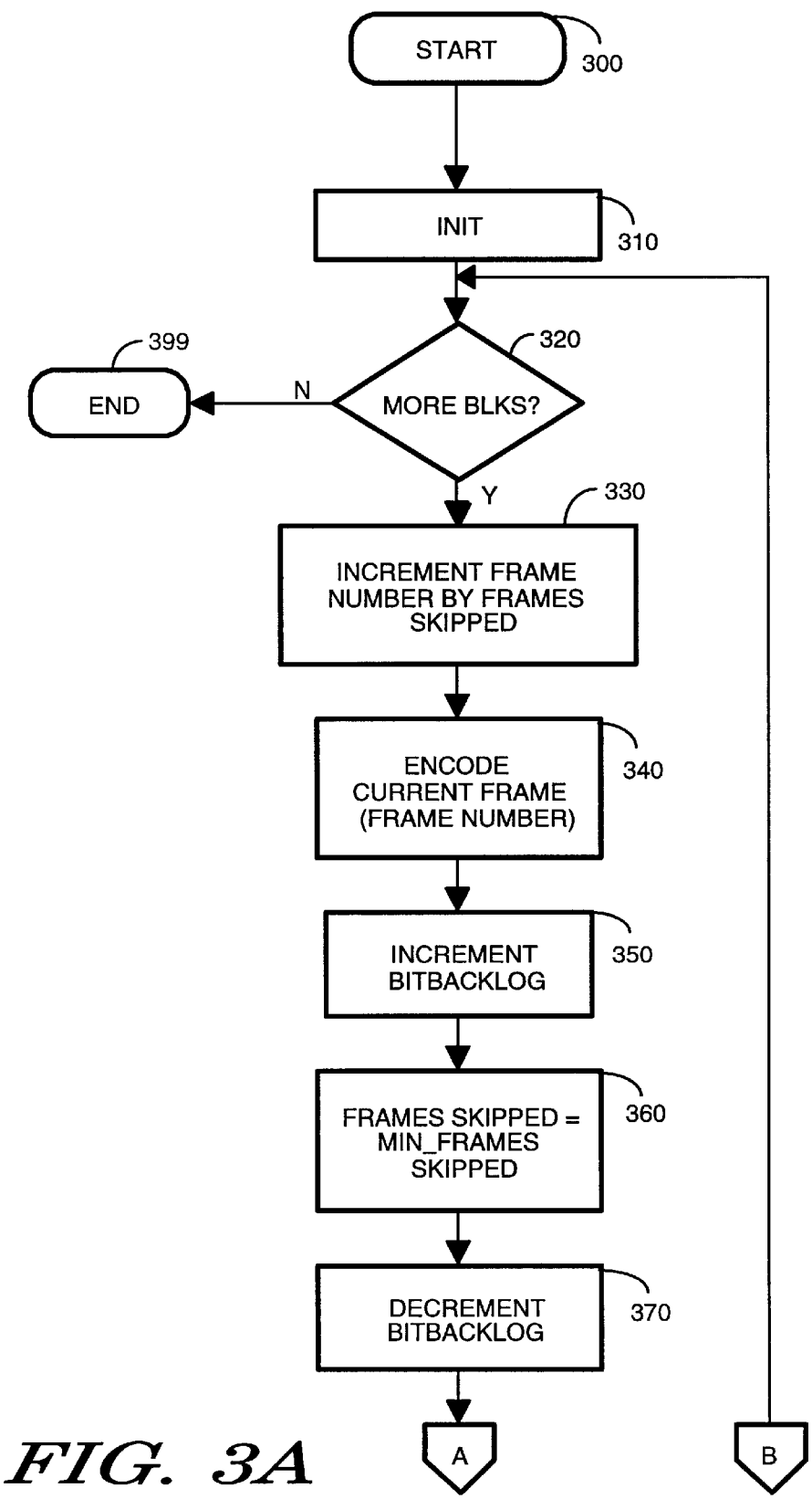
FIGS. 3A–B are a flowchart of bitrate controller logic of an exemplary embodiment of the invention.
Figure 3B:
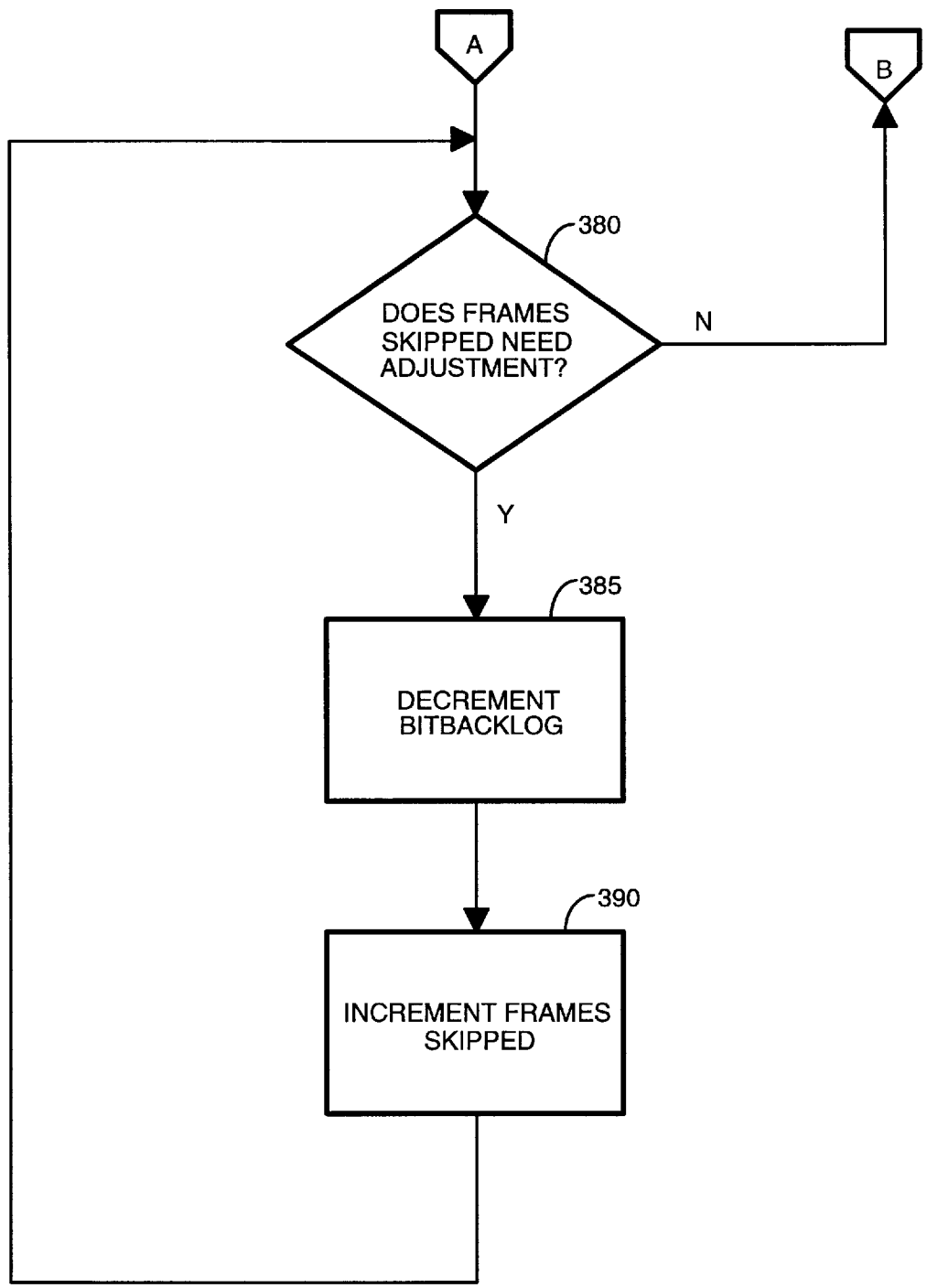

FIGS. 3A–B are a flowchart describing an exemplary bitrate controller 210. An exemplary embodiment is implemented as a modified version of Telenor H.263 encoder version 2.0. In this example, the variables are the ones used by the Telenor encoder.

The logic begins at step 300 and proceeds to step 310, which initializes certain variables. In particular, Min_Frames_Skipped is set to 3; Max_Frames_Skipped is set to 8; Frame_Number is set to 0; Frames_Skipped is set to 0; BitBacklog is set to 0; and Delay_Between_Frames is set to 1/30. These variables and how they are used are discussed below. Assume a target encoding rate (Encoding Rate) of 20 Kb/s, leaving extra bandwidth in a 28.8 Kb/s channel for audio data and for packet overhead.

Figure 4:
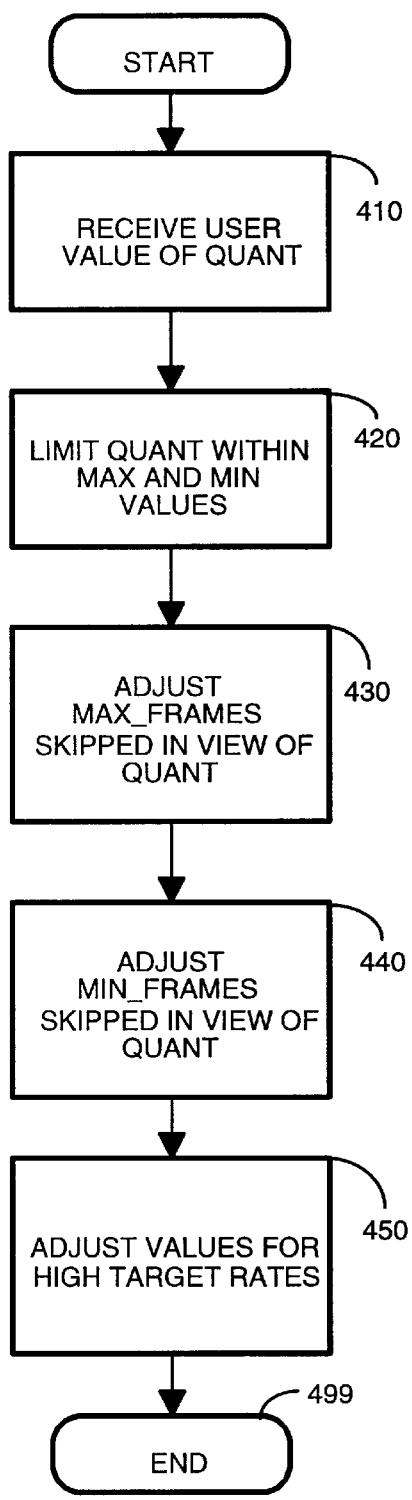
FIG. 4 is a flowchart of a portion of the bitrate controller logic of FIG. 3 in more detail.

Besides the above, step 310 initializes a quantization parameter Quant and adjusts the frame rate limits Min_ and Max_Frames_Skipped as shown in FIG. 4. Quant refers to the pictures quantization level. A higher Quant means relatively coarser detail; a lower Quant means relatively finer detail. The frame rate is adjusted dynamically in accordance with a variable Frames_Skipped, but the amount of adjustment is limited by Min_ and Max_Frames_Skipped, as will be described below.

The Quant initialization and the frame rate limits adjustment logic starts in step 400 and proceeds to step 410, which receives a user input indicating the level of quantization desired. This may be supplied, for example, from software that interprets a graphical user interface's slider bar control. The logic proceeds to step 420, which limits the quantization variable Quant between a maximum and minimum value. For example, any received value greater than 30 may force Quant to 30, and any value less than 8 may force Quant to 8. The logic proceeds to step 430 and 440, which analyze Quant and adjusts Max_ and Min_Frames_Skipped, accordingly. For example, in step 430, relatively low values of Quant, in particular values less than 12, force Max_Frames_Skipped to 20. Thus, step 430 may be thought of forcing down the maximum frame rate for pictures having fine detail. Analogously, in step 440, relatively high values of Quant, in particular values greater than 29, force Min_Frames_Skipped to 2. Thus, step 440 may be thought of forcing up the minimum frame rate for pictures having coarse detail. The above steps use empirically determined values that were chosen to provide a relatively simple production environment. Obviously, many other values are applicable, and for environments, where increased user control makes sense, these parameters may be set by the production user.

Step 450 determines if the target rate is higher than 30 Kb/s, as might be the case for PCM modems or ISDN connections or the like. If the target rate is higher, other adjustments are made. In particular, Min_Frames Skipped is set to 2; Min_Frames_Skipped is set to 1, if Quant is higher than 28, and Max_Frames_Skipped is set to 17, if Quant is less than 12. Again this step uses empirically determined values that were chosen to provide a relatively simple production environment.

The logic ends in step 499, which returns the flow back to the flowcharts of FIGS. 3A–B.

Referring back to FIGS. 3A–B, after step 310, the limits on the frame rate and the quantization parameters are set. These values are used throughout the encoding. By maintaining the quantization at a constant level, the amount of data necessary to encode the frame will depend on the informational content of the frame. Thus, the bitrate will vary as the informational content of frames vary. Moreover, perceptually the quality of the video will remain substantially level, with some fluctuation resulting from varying frame rates, as discussed below.

The logic proceeds to step 320, which determines if more frames, or blocks, need to be encoded. If not, the logic proceeds to step 399, which ends the encoding process.

If there are more frames and blocks to be encoded, the logic proceeds to step 330, which increments the Frame_Number by a value equal to Frames_Skipped. Frame_Number identifies the frame of Video In to be encoded, and Frames Skipped controls the frame rate.

The logic proceeds to step 340, which encodes the current block, identified by Frame_Number.

The logic proceeds to step 350, which increments the variable BitBacklog by the number of bits used to encode the frame. BitBacklog effectively keeps a running total of the number of bits used in encoding the sequence in comparison to the number of bits that can be sent up to the current time, i.e., a budgeted amount. The budgeted amount is not a hard budget in that slightly exceeding the budget is not fatal. An exemplary server includes logic for sending an initial burst of data to compensate for network jitter and the like; slightly exceeding the budget is essentially indistinguishable from jitter.

The logic proceeds to step 360, which sets Frames_Skipped to Min_Frames_Skipped. This is done as an initial attempt to encode the video at a maximum frame rate. Thus, for a Min_Frames_Skipped of 2, the frame rate is 15 (30/2); for a Min_Frames_Skipped of 3, the frame rate is 10 (30/3). The numerator "30" in the preceding parenthetical statements refers to the absolute maximum frame rate of H.263, which is about 30 frames per second.

The logic proceeds to step 370, which adjusts BitBacklog in a manner to reflect the increment in time associated with the streaming of the new frame corresponding to Frames_Skipped. Namely, BitBacklog is adjusted to represent that the corresponding encoded data will not be sent until some time in the future as reflected by Frames_Skipped. In particular, the BitBacklog decrements by an amount equal to the following:

Frames_Skipped*target rate*Delay_Between_Frames

The logic proceeds to step 380, which determines whether Frames_Skipped needs adjustment in view of BitBacklog. In particular, step 380 compares the BitBacklog to determine whether the encoding process would be over a budgeted amount if a frame were encoded at the currently set frame rate. In brief, if the encoding would be over budget, Frames_Skipped is adjusted to decrease the frame rate until the minimum frame rate is reached or until the encoding process is within budget. In either case, the next frame is encoded and the process is repeated. If the above iteration is stopped because the minimum frame rate is reached and the encoding process is still over budget, it is not necessarily fatal. This is so, because, as described above, the system can slightly exceed budget due to the server's logic for addressing network jitter and the like. In such case, the next iterations of encoding frames may cause the encoding to catch up to the budget by continuing to minimize the frame rate.

More specifically, the BitBacklog is compared to see if it is greater than or equal to the Encoder Rate multiplied by the Delay_Between Frames, i.e., the highest possible amount of data that can be sent in the time Delay_Between_Frames. If BitBacklog is greater than or equal to that amount, the encoding would be over budget.

If the encoding is under budget or if Frames_Skipped is equal (or greater than) Max_Frames_Skipped then the logic proceeds to step 320 to encode the next frame, as outlined above.

If the encoding is over budget and if Frames_Skipped can be adjusted higher without equaling or exceeding Max_Frames_Skipped, then the logic proceeds to step 385. In step 385, the BitBacklog decrements, this time however by an amount equal to the Delay_Between_Frames multiplied by the Encoder Rate. This decrement corresponds to holding off the encoding for another frame time slot, and is done in view of the following step 390.

In step 390, Frames_Skipped is incremented by one. Thus, the encoding of a frame is held off for one frame time slot. Thus the adjustment of BitBacklog by one Delay_Between_Frames. The logic loops back to step 380 to determine whether this dynamic adjustment of Frames_Skipped (and thus the frame rate) has helped the encoding process fall within budget or if the minimum frame rate has been attained. The loop between 380 and 390 continues as necessary to adjust Frames_Skipped, thereby decreasing the frame rate, and to adjust BitBacklog correspondingly until BitBacklog indicates the encoding process is within budget or until Max_Frames_Skipped (or conversely the minimum frame rate) is reached.

c. Packetizer

The packetizer 230 packetizes the encoded frames 227 into a specified format to form a file 235 that may be used by server 240 to stream the contents thereof. Much of the details of the packetizer are discussed in the related applications, identified and incorporated above.

In short, a new aspect of the packetizer is that it time stamps the packets with a server time stamp. This stamp may eventually be used by an exemplary server to schedule the sending of packets containing the encoded data. The server time stamps are constructed such that, if used by the server 240 to schedule the delivery of the packets, the channel will be used efficiently, and in a manner in which for a given time quanta the video that is sent may correspond not only to the data needed currently but also for data that will be needed in the future. All packets, in an exemplary embodiment, are sent in order, but some packets may be sent sooner than needed.

More specifically, the encoded video frames 227 are applied to packetizers 230. In short, the packetizer arranges the encoded data in pre-packetized form with the necessary packet information, see for example, U.S. application Ser. Nos. 08/711,701 and 08/711,702, identified and incorporated above. For the most part, each video frame will have its own corresponding packet, such as a UDP packet, but some large frames may be divided up into several packets.

Figure 5A:
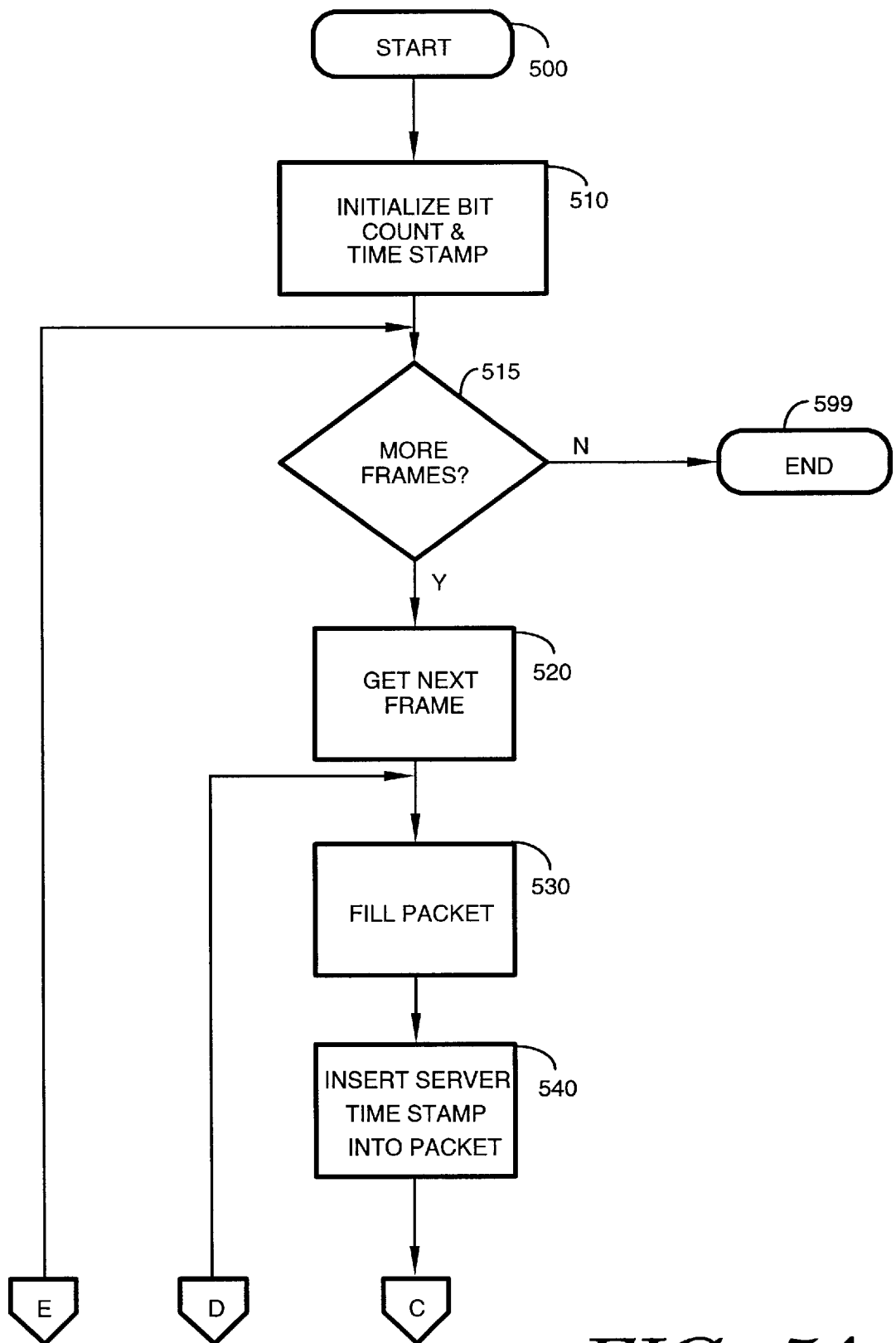
FIGS. 5A–B are a flowchart of packetizer logic of an exemplary embodiment of the invention.
Figure 5B:
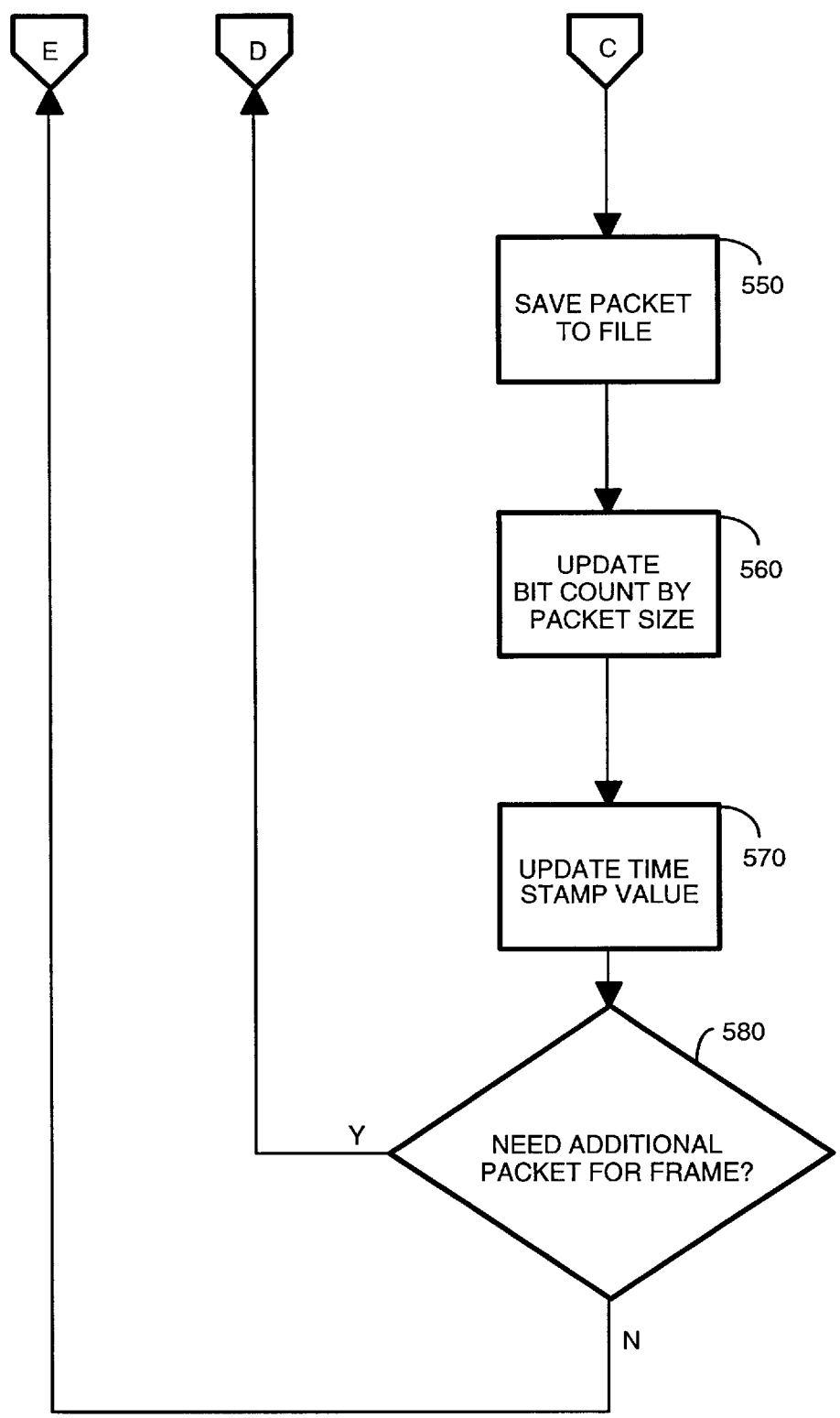

FIGS. 5A–B are a flowchart of exemplary packetizing logic. The logic begins at step 500 and proceeds to step 410, which initializes a server time stamp and Bit Count variable, each to zero.

The logic proceeds to step 515, which determines if more frames need to be packetized. If not, the logic proceeds to step 599, which ends the flow.

If more frames need to be packetized, the logic proceeds to step 520, which gets the next encoded video frame 227, along with control information indicating the Encoder Rate, or target rate, for which the data is encoded.

The logic proceeds to step 530 which constructs a UDP packet, filling it with the encoded video and other information. In this regard, the construction is analogous to that described in the above co-pending application U.S. patent applications.

The logic proceeds to step 540, which inserts the server time stamp within the packet, in particular, within a portion of the packet known as the packet descriptor. The packet descriptor is an entity used by an exemplary server 240 to control streaming. The time stamp is set to the following:

BitCount/(1.1* Encoder Rate)

The factor 1. 1, which is empirically determined, is used to keep the modem at full capacity.

The logic proceeds to step 550, which writes the video packet in a specified format to a file 235.

The logic proceeds to step 560, which increments the Bit Count by the size of the packet written to the file.

The logic proceeds to step 570, which updates the server time stamp. In particular, the server time stamp is updated by an amount equal to the Bit Count divided by the Encoder Rate.

The logic proceeds to step 580, which determines if more packets are needed for the current frame. If so, the logic proceeds back to step 530. If not, the logic loops back to step 515.

(Other encoders, not shown, for example, an audio encoder, may encode and packetize information to be formatted into the eventual file 235.)

d. File Format

Figure 6:
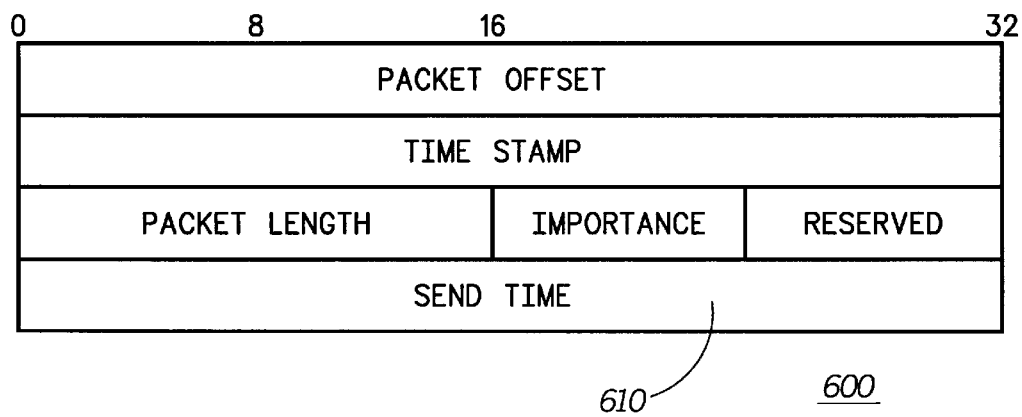
FIG. 6 shows an exemplary packet descriptor of an exemplary embodiment of the invention.

The related applications, identified and incorporated above, describe a multimedia file and method for forming same. The same arrangement may be used in an exemplary embodiment, except that the packet descriptors should now include a separate field for holding the server time stamp. FIG. 6 shows an exemplary descriptor having send time stamp 610. (The other fields are discussed in the co-pending applications.)

e. Server

Analogously, the related applications, identified and incorporated above, describe an exemplary system for sending multimedia files of the above type. Though the same arrangement may be used in an exemplary embodiment with the exception that the server would use a server time stamp for the scheduling of packets, an exemplary embodiment includes certain modifications to the embodiment described in the related applications.

First, unlike the embodiments described in the related applications, an exemplary embodiment does not use retransmit logic (steps 1240–1260 of FIG. 12 and corresponding text of the related applications). Second, an exemplary embodiment does not include the "throttle-up" and "throttle-down" logic of the related applications (FIG. 13 and corresponding text of the related applications). Third, an exemplary embodiment does not include the calculation of "round-trip delay" as part of channel characterization.

Figure 7:
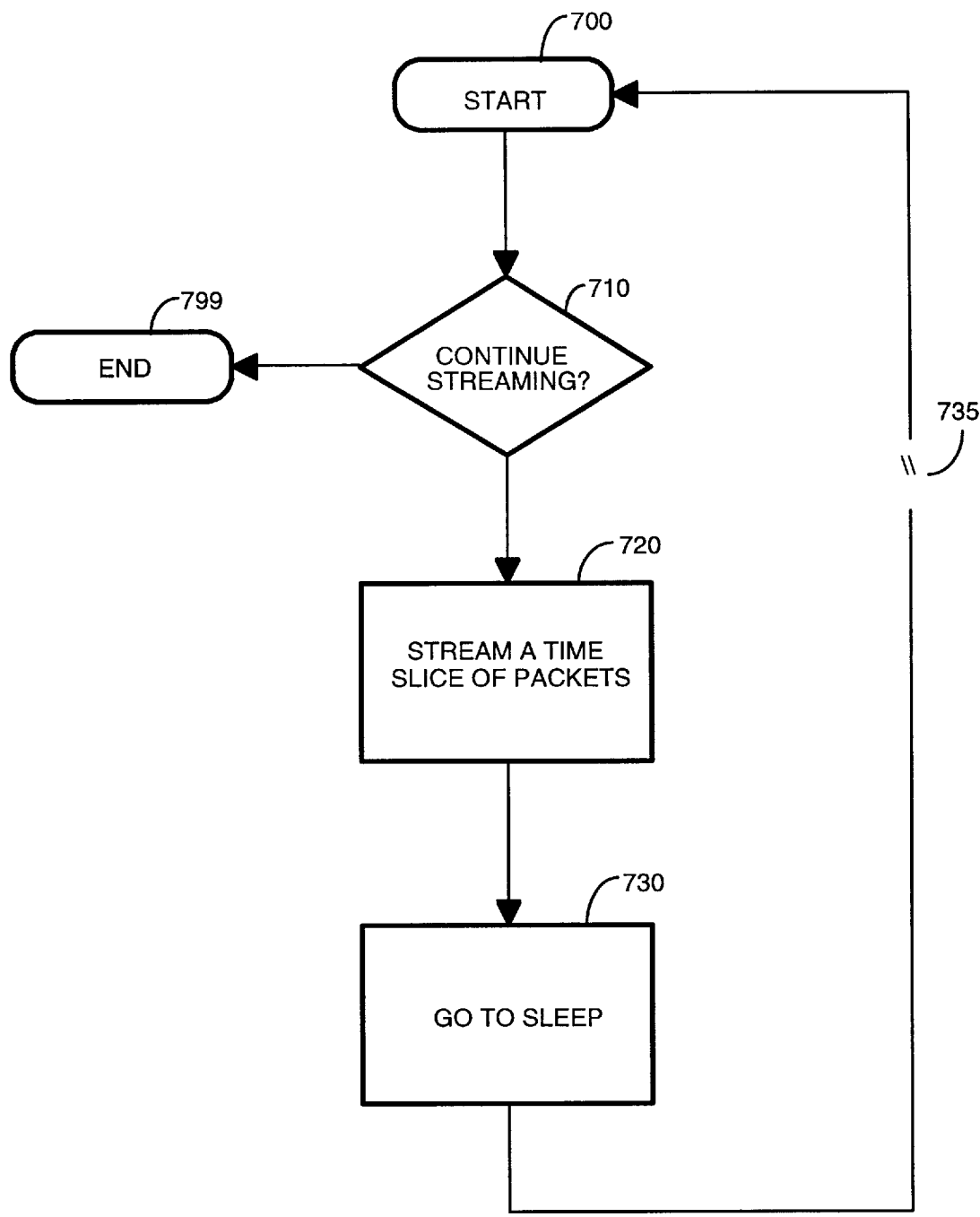
FIG. 7 shows exemplary server logic of an exemplary embodiment of the invention.

FIG. 7 is a flowchart of the exemplary server logic and is somewhat similar to the flowchart of FIG. 12 of the related applications. Step 710 determines whether the server needs to send more packets. If not, the logic ends in step 799; if so, the logic proceeds to step 720, which sends a time slice's worth of packets. A time slice's worth is determined from looking at the server time stamp 610 in relation to the server scheduling clock. (This step is analogous to the logic of the related applications, except the related application used the same time stamp for server scheduling and for play-back scheduling) After sending a time slice's worth of packets, the logic goes to sleep 730, informing the scheduler of a corresponding wake-up time.

An exemplary server is able to support file formats of the current type and of the type described in the related applications. In particular, the directory preamble, described in the related applications, is modified to include a descriptor size field. The values stored therein uniquiely distinguish between the two formats, informing the server which time stamp should be used for scheduling.

III. Other Embodiments

The above embodiment was primarily focused on video data according to H.263. Skilled artisans will appreciate that the above principles are applicable to other formats, e.g., H.261, and types, e.g., wavelets, of data. These formats and types may include proprietary formats as well as ones organized according to official standards, such as the ITU.

In the context of H.263, the quality criteria selected in the exemplary embodiment were a constant quantization level and a limited frame rate. These criteria, however, may be varied considerably within the principles of the invention. Besides having different ranges for frame rates, the quantization level may be allowed to vary somewhat, possibly bounded, and in other contexts, criteria other than quantization and frame rate may be applicable.

The above arrangement focused on one-pass encoding and packetizing, but other advantages may be attained in exchange for increased complexity. For example, under the above arrangement bits are conserved during the encoding so that they may be used for future portions of video. Due to the one-pass nature, however, the encoding has no knowledge of future requirements. A multipass approach could provide information about the encoding needs for portions of video. Consequently, it may be determined that conserving bits is unnecessary because it is not needed by future portions. Likewise, it may be also determined that the amount of bits conserved may still be insufficient to help with the transmission of future video and that the future portion may still require significant sacrificing of quality for the encoding thereof. In this regard, a multi-pass approach could inform the user that by decreasing the level of detail for encoding, yet more bits may be conserved and that the overall play-back may be of more uniform quality.

As outlined above, the statistical nature of video is such that many frames are identical to prior frames. For example, a several second portion of video may be of a still picture having no motion or other changes. In such cases, once the image is transmitted no other frames need be sent until changes have actually been detected. Both the above arrangement and the prior arrangements continue to send frames in such case. By changing the controller logic, frames can be detected which have no differences, and in such cases, the controller can be modified so that no frames are sent. The above idea of sending no frames needs some qualification in that the relevant standard, for example, H.263, or the server implementation by design may require a frame to be sent at some minimum rate. For example, H.263 expects a frame at minimum about every 8 seconds.

Skilled artisans will appreciate that, although the quality criteria of an exemplary embodiment were applied consistently throughout the encoding of a video sequence, the parameters may be adjusted at various architectural levels. For example, in the exemplary embodiment Quant and the limits on frame rate were set for the entire sequence, but other embodiments could change or adjust these variables on a picture by picture basis or on finer levels of control, such as macroblock by macroblock.

The exemplary embodiment encodes at a variable bitrate, allowing unused bandwidth to effectively be conserved so that it may be used for sending future portions of video streams. The amount of bits that may be conserved and thus exploited may be limited by the buffering capabilities of the client. The above controller design may be modified to account for various client buffering capabilities so that too many bits are not conserved. "Too many" in this regard means that the extra bits used to carry data for future video frames are incapable of being stored at the client. In such cases, when "too many" is detected or when it seems imminent, the encoding parameters may be adjusted akin to version 1.1 of the TrueStream Streaming Software. In this sense, the variable bit rate encoding has been fully exploited and as extra bandwidth may still be present, it might as well be used to improve the quality of the video through finer detail pictures and higher frame rates.

The present invention may be embodied in other specific forms without departing from its spirit or essential characteristics. the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A server for streaming to a client device video information stored in pre-packetized form in a multimedia file stored on a computer-readable medium, the multimedia file having packet descriptors that describe the packets of video information, wherein the packet descriptor includes a server time stamp, the server comprising:

logic for sending a packet of information on to a communication network, in response to an initiation request;

logic for analyzing the server time stamps of the packets of video information to schedule corresponding initiation requests, such that the communication network is utilized at a substantially constant transmission rate.

2. A system for sending video information encoded at a variable bitrate on a network at a substantially constant rate, comprising:

a packetizer for forming packets of video data that have been encoded at a variable bit rate, the packetizer maintaining a channel budget of the amount of data in the packets and inserting server time stamps into the formed packets, the server time stamps being calculated so that the sending of the packets, based on the time stamps, will correspond to a substantially constant bitrate corresponding to the channel budget; and a server, having logic for analyzing the server time stamps of the video packets and for scheduling the sending of packets on to a network based on the time stamps.

* * * * *